United States Patent
Hirono et al.

(10) Patent No.: US 9,372,389 B2
(45) Date of Patent: Jun. 21, 2016

(54) PROJECTOR AND PORTABLE TERMINAL

(71) Applicant: KABUSHIKI KAISHA TOSHIBA, Minato-ku, Tokyo (JP)

(72) Inventors: Masatoshi Hirono, Kanagawa-ken (JP); Masataka Shiratsuchi, Kanagawa-ken (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 326 days.

(21) Appl. No.: 14/171,879

(22) Filed: Feb. 4, 2014

(65) Prior Publication Data

US 2014/0333906 A1 Nov. 13, 2014

(30) Foreign Application Priority Data

May 8, 2013 (JP) .................................. 2013-098786

(51) Int. Cl.
| | |
|---|---|
| *G02B 26/00* | (2006.01) |
| *G03B 21/28* | (2006.01) |
| *H04N 9/14* | (2006.01) |
| *G03B 21/53* | (2006.01) |
| *G02B 26/08* | (2006.01) |
| *G03B 21/20* | (2006.01) |
| *H04N 9/31* | (2006.01) |
| *G02B 26/10* | (2006.01) |
| *G02B 13/14* | (2006.01) |
| *G02B 26/06* | (2006.01) |

(52) U.S. Cl.
CPC ............ *G03B 21/53* (2013.01); *G02B 26/0816* (2013.01); *G02B 26/101* (2013.01); *G02B 26/105* (2013.01); *G03B 21/2033* (2013.01); *H04N 9/3129* (2013.01); *H04N 9/3173* (2013.01); *H04N 9/3185* (2013.01); *G02B 13/14* (2013.01); *G02B 26/06* (2013.01)

(58) Field of Classification Search
CPC .... G03B 21/14; G03B 21/142; G03B 21/145; G03B 21/2066; G02B 26/00; G02B 26/105; G02B 26/10; G02B 26/0816; G02B 26/0875; H04N 9/14; H04N 9/3129
USPC ............................ 353/39, 98, 99, 79, 42, 119
See application file for complete search history.

(56) References Cited

U.S. PATENT DOCUMENTS 5,365,288 A * 11/1994 Dewald .................. G02B 17/00
348/203
8,102,580 B2 * 1/2012 Duncan ................ G02B 26/101
359/196.1

(Continued)

FOREIGN PATENT DOCUMENTS

JP 2009-258569 11/2009

*Primary Examiner* — William C Dowling
(74) *Attorney, Agent, or Firm* — Amin, Turocy & Watson LLP (57) ABSTRACT

According to one embodiment, a projector includes a light source unit, a light scanning unit, and a focus controller. The light source unit emits laser light. The light scanning unit includes a holder and a reflective surface. The holder is capable of a first rotation operation around a first direction. The reflective surface is held by the holder and is capable of a second rotation operation around a second direction intersecting the first direction. The light scanning unit scans the laser light by the first and second rotation operations. The focus controller is provided between the light source unit and the light scanning unit in an optical path of the laser light to modify a convergence of the laser light. An angle between a plane including the first and second directions, and an image surface is not less than 80 degrees and not more than 100 degrees.

19 Claims, 6 Drawing Sheets

(56) References Cited

U.S. PATENT DOCUMENTS

| | | | |
|---|---|---|---|
| 8,702,244 B2* | 4/2014 | Choi | G06F 1/1626 349/157 |
| 2012/0262680 A1 | 10/2012 | Hudman | |
| 2013/0127717 A1* | 5/2013 | Nagashima | G06F 3/0423 345/158 |
| 2013/0222771 A1* | 8/2013 | Tsubota | G02B 26/101 353/20 |
| 2015/0109649 A1* | 4/2015 | Masuda | G02B 26/10 359/214.1 |

* cited by examiner

PROJECTOR AND PORTABLE TERMINAL

CROSS-REFERENCE TO RELATED APPLICATIONS

This application is based upon and claims the benefit of priority from Japanese Patent Application No. 2013-098786, filed on May 8, 2013; the entire contents of which are incorporated herein by reference.

FIELD

Embodiments described herein relate generally to a projector and a portable terminal.

BACKGROUND

It is desirable to enlarge and display the information of a portable terminal. To this end, a mini projector is used. It is desirable for the projector to provide high resolution to realize high display quality.

DETAILED DESCRIPTION

According to one embodiment, a projector includes a light source unit, a light scanning unit, and a focus controller. The light source unit is configured to emit laser light. The light scanning unit includes a holder and a reflective surface. The holder is capable of a first rotation operation around a first direction. The reflective surface is held by the holder and is capable of a second rotation operation around a second direction intersecting the first direction. The laser light is configured to be incident on the reflective surface. The light scanning unit is configured to scan the laser light by the first rotation operation and the second rotation operation. The focus controller is provided between the light source unit and the light scanning unit in an optical path of the laser light to modify a convergence of the laser light in conjunction with the first rotation operation. An angle between a plane and an image surface is not less than 80 degrees and not more than 100 degrees. The plane includes the first direction and the second direction. The image surface is formed by the laser light emitted from the light scanning unit.

According to one embodiment, a portable terminal includes a projector and a communicator. The projector includes a light source unit, a light scanning unit, and a focus controller. The light source unit is configured to emit laser light. The light scanning unit includes a holder and a reflective surface. The holder is capable of a first rotation operation around a first direction. The reflective surface is held by the holder and is capable of a second rotation operation around a second direction intersecting the first direction. The laser light is configured to be incident on the reflective surface. The light scanning unit is configured to scan the laser light by the first rotation operation and the second rotation operation. The focus controller is provided between the light source unit and the light scanning unit in an optical path of the laser light to modify a convergence of the laser light in conjunction with the first rotation operation. An angle between a plane and an image surface is not less than 80 degrees and not more than 100 degrees. The plane includes the first direction and the second direction. The image surface is formed by the laser light emitted from the light scanning unit. The communicator is capable of acquiring data to be displayed by the projector.

Various embodiments will be described hereinafter with reference to the accompanying drawings.

The drawings are schematic or conceptual; and the relationships between the thicknesses and widths of portions, the proportions of sizes between portions, etc., are not necessarily the same as the actual values thereof. Further, the dimensions and/or the proportions may be illustrated differently between the drawings, even for identical portions.

In the drawings and the specification of the application, components similar to those described in regard to a drawing thereinabove are marked with like reference numerals, and a detailed description is omitted as appropriate.

First Embodiment

Figure 1A:
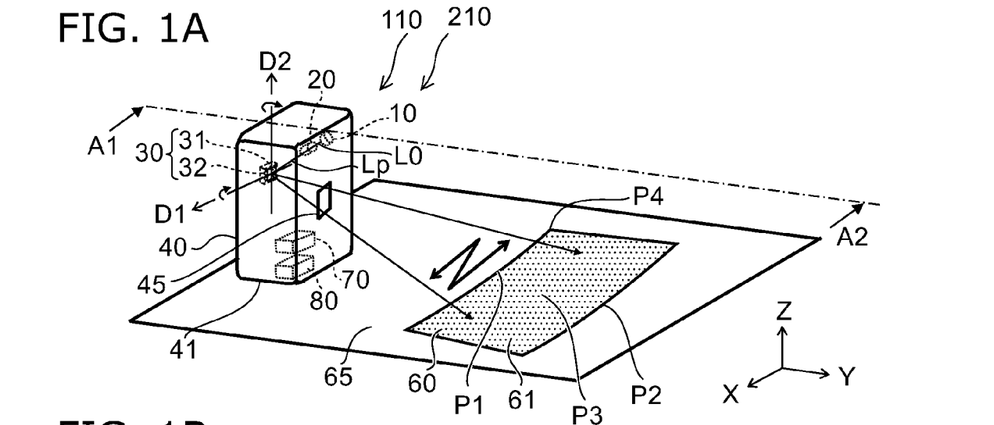
FIG. 1A to FIG. 1C are schematic views showing a projector and a portable terminal according to a first embodiment.
Figure 1B:
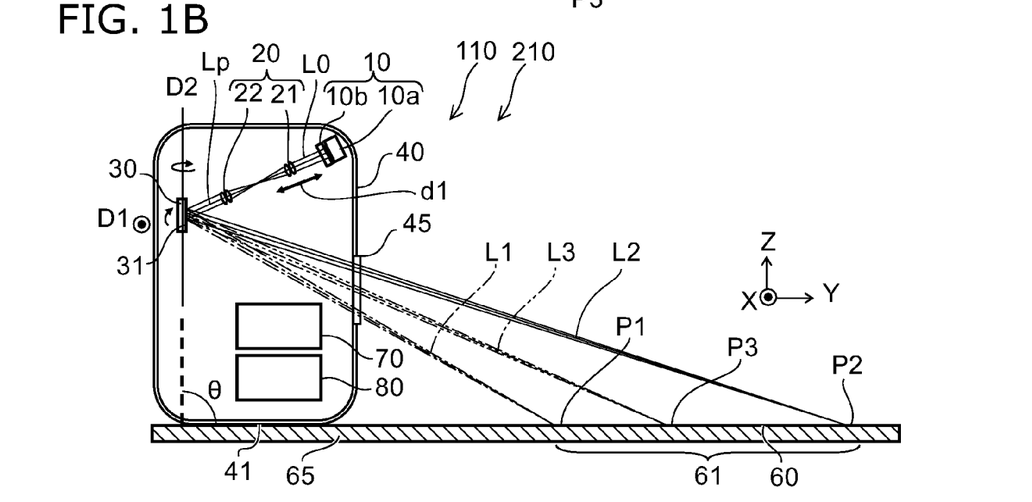
Figure 1C:
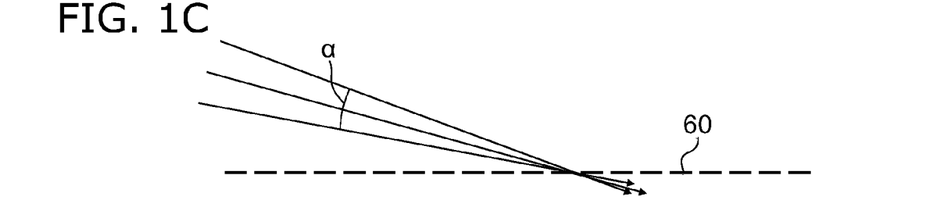

FIG. 1A to FIG. 1C are schematic views showing a projector and a portable terminal according to a first embodiment.

FIG. 1A is a schematic perspective view showing the projector, the portable terminal, and the state of use of the projector and the portable terminal. FIG. 1B is a cross-sectional view corresponding to line A1-A2 of FIG. 1A. FIG. 1C is a schematic view showing the light from the projector.

Figure 2:
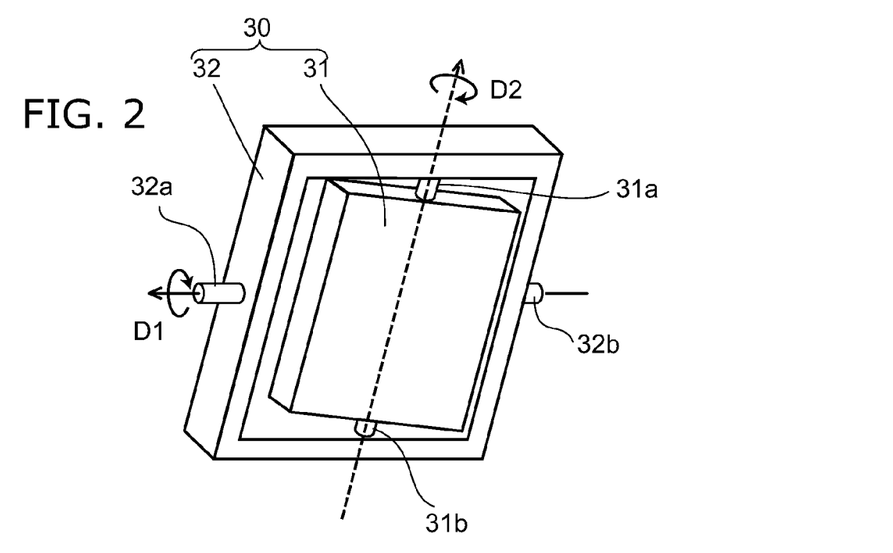
FIG. 2 is a schematic view showing a portion of the projector and portable terminal according to the first embodiment.

FIG. 2 is a schematic view showing a portion of the projector and portable terminal according to the first embodiment.

As shown in FIG. 1A and FIG. 1B, the portable terminal 210 according to the embodiment includes the projector 110 and a communicator 80. The communicator 80 communicates, for example, from the portable terminal 210 to the outside by, for example, an electrical signal, an optical signal, etc. The communicator 80 is capable of acquiring data to be displayed by the projector 110. The projector 110 can display, for example, an image based on the data transferred by the communicator 80, etc.

The projector 110 includes a light source unit 10, a light scanning unit 30, and a focus controller 20. In the example, a controller 70 is further provided. The controller 70 is connected to the light source unit 10, the light scanning unit 30, and the focus controller 20 to control the operations of the light source unit 10, the light scanning unit 30, and the focus controller 20.

The light source unit 10 emits laser light L0. In the example, the light source unit 10 includes a laser element 10a and a collimating optical element 10b. The laser element 10a emits the laser light L0. The collimating optical element 10b collimates the laser light L0 emitted from the laser element 10a. The laser light L0 that is emitted from the collimating optical element 10b is, for example, substantially parallel light. The convergence angle of the laser light L0 emitted from the collimating optical element 10b is, for example, not more than ±5 degrees.

The light scanning unit 30 includes a holder 32 and a reflective surface 31.

FIG. 2 shows the light scanning unit 30. The holder 32 is capable of a first rotation operation around a first direction D1. The reflective surface 31 is held by the holder 32. The reflective surface 31 is capable of a second rotation operation around a second direction D2. The second direction D2 is a direction intersecting the first direction D1.

For example, the holder 32 includes a first holding body 32a and a second holding body 32b. The direction from the first holding body 32a toward the second holding body 32b is parallel to the first direction D1. The holder 32 is fixed to a not-shown substrate, etc., by the first holding body 32a and the second holding body 32b. The first rotation operation of the holder 32 is performed around the first holding body 32a and the second holding body 32b.

For example, a third holding body 31a and a fourth holding body 31b are provided in the light scanning unit 30. The direction from the third holding body 31a toward the fourth holding body 31b is parallel to the second direction D2. One end of the reflective surface 31 is fixed to the holder 32 by the third holding body 31a. The other end of the reflective surface 31 is fixed to the holder 32 by the fourth holding body 31b. The second rotation operations of the reflective surface 31 is performed around the third holding body 31a and the fourth holding body 31b. Because the reflective surface 31 is held by the holder 32, the reflective surface 31 also is subjected to the first rotation operation in conjunction with the first rotation operation of the holder 32.

The laser light L0 is incident on the reflective surface 31.

As shown in FIG. 1A and FIG. 1B, the light scanning unit 30 scans the laser light L0 by the first rotation operation and the second rotation operation. This operation is controlled by, for example, the controller 70. The light scanning unit 30 may include, for example, a MEMS (Micro Electro Mechanical Systems) element, etc.

The angle (the absolute value) of the rotation of the first rotation operation is, for example, not more than 10 degrees. The angle (the absolute value) of the rotation of the second rotation operation is, for example, not more than 20 degrees. "Rotation operation" also includes such rotations of small angles. In the embodiment, the rotation operations are rotation operations of angles that are less than one rotation.

The focus controller 20 is provided between the light source unit 10 and the light scanning unit 30 in an optical path Lp of the laser light L0. The focus controller 20 modifies the convergence of the laser light L0 in conjunction with the first rotation operation. This operation is controlled by, for example, the controller 70.

In the example, the laser light L0 that is emitted from the collimating optical element 10b is incident on the focus controller 20. The laser light L0 that is emitted from the focus controller 20 is incident on the reflective surface 31 of the light scanning unit 30. The scanning of the laser light L0 is performed by the reflective surface 31 being subjected to the rotation operations to change the travel direction of the laser light L0 reflected at the reflective surface 31.

In the example, the focus controller 20 includes converging optical elements. The laser light L0 that is emitted from the light source unit 10 is incident on the converging optical elements. In the example, the focus controller 20 includes a first converging optical element 21 and a second converging optical element 22. The first converging optical element 21 is disposed between the light source unit 10 and the second converging optical element 22 in the optical path Lp of the laser light L0. The second converging optical element 22 is disposed between the first converging optical element 21 and the reflective surface 31 in the optical path Lp of the laser light L0. The position of the focal point of the first converging optical element 21 substantially matches the position of the focal point of the second converging optical element 22. The first converging optical element 21 and the second converging optical element 22 may respectively include, for example, two convex lenses.

For example, the first converging optical element 21 is movable along the optical path Lp of the laser light L0. For example, the convergence of the laser light L0 changes due to the change of the position of the first converging optical element 21. For example, the first converging optical element 21 is movable in conjunction with the first rotation operation.

Thus, the focus controller 20 may include movable converging optical elements that emit the laser light L0 to converge. By using the movable converging optical elements as the focus controller 20, the convergence of the laser light L0 emitted from the focus controller 20 is modified.

In the example, the projector 110 includes a housing 40. The light source unit 10, the light scanning unit 30, and the focus controller 20 are contained in the interior of the housing 40. In the portable terminal 210, the communicator 80 also is contained in the housing 40. For example, the housing 40 has a window 45. The laser light L0 that is reflected at the reflective surface 31 of the light scanning unit 30 is emitted from the window 45.

The housing 40 has, for example, a bottom surface 41. The housing 40 is placed on, for example, a surface 65 of a desk, etc. (e.g., the upper surface of the desk, etc.). The bottom surface 41 opposes the surface 65. In other words, the projector 110 is used by being placed on, for example, the surface 65 of the desk, etc. In the embodiment, the surface 65 may be, for example, the surface of an interior wall, etc.

The laser light L0 to be scanned is emitted from the projector 110 and irradiated onto the surface 65. The laser light L0 is imaged on the surface 65. In other words, the laser light L0 forms an image surface 60. In the embodiment, for example, the image surface 60 is substantially parallel to the surface 65 of the desk, etc.

For example, a direction perpendicular to the image surface 60 is taken as a Z-axis direction. One direction perpendicular to the Z-axis direction is taken as an X-axis direction. A direction perpendicular to the Z-axis direction and perpendicular to the X-axis direction is taken as a Y-axis direction. For example, the Z-axis direction is substantially perpendicular to the surface 65 of the desk, etc.

For example, the projector 110 is separated in the Y-axis direction from the image surface 60 formed by the projector 110. The image surface 60 is a surface on which the laser light L0 is scanned by the light scanning unit 30. The Y-axis direction is the direction away from the projector 110. For example, one side (a vertical-direction side) of a screen 61 displayed by the projector 110 is, for example, substantially aligned with the Y-axis direction by the first rotation operation around the first direction D1. One other side (a horizontal-direction side) of the screen 61 displayed by the projector 110 is, for example, substantially aligned with the X-axis direction by the second rotation operation around the second direction D2. As described below, because the screen 61 is formed by the laser light L0 being scanned, the configuration of the screen 61 is fan-like. In the embodiment, the configuration of the screen 61 is not always rectangular.

For example, the first rotation operation of rotating the reflective surface 31 of the light scanning unit 30 around the first direction D1 is performed. Thereby, the position of the laser light L0 on the image surface 60 is changed, for example, substantially along the vertical direction of the screen 61. By performing the second rotation operation of rotating the reflective surface 31 of the light scanning unit 30 around the second direction D2, the position of the laser light L0 on the image surface 60 is changed, for example, substantially along the horizontal direction of the screen 61. Thereby, the irradiation position of the laser light L0 changes along the vertical direction and horizontal direction. The intensity and color of the laser light L0 are modulated to correspond to the image information in conjunction with the change of the irradiation position of the laser light L0. This operation is controlled by, for example, the controller 70. Thereby, the image can be displayed on the image surface 60.

For example, the laser light L0 is scanned in a line configuration substantially along the horizontal direction at one position in the vertical direction. Subsequently, the position is changed in the vertical direction; and the laser light L0 is scanned in a line configuration substantially along the horizontal direction at that position. The image is displayed at the image surface 60 by repeating the scanning.

To simplify the description recited above, the position of the laser light L0 on the image surface 60 is described as changing in a linear configuration substantially along the horizontal direction or vertical direction. In the embodiment, because the laser light L0 is scanned by performing the rotation operations of the reflective surface 31, the position of the laser light L0 on the image surface 60 changes, for example, along a line having an arc-like configuration. To simplify the following description as well, the position of the laser light L0 on the image surface 60 may be described in the following description as changing in a linear configuration.

To simplify the description hereinbelow, the scanning direction due to the first rotation operation is taken to be the vertical direction; and the scanning direction due to the second rotation operation is taken to be the horizontal direction.

A simple optical system made of the light source unit 10, the light scanning unit 30, and the focus controller 20 is used in the projector 110 and the portable terminal 210 according to the embodiment. Thereby, the projector 110 and the portable terminal 210 can be compact.

In the embodiment, the convergence of the laser light L0 is modified by the focus controller 20. As shown in FIG. 1C, the laser light L0 converges on the image surface 60. A convergence α of the laser light L0 corresponds to, for example, the angle of the spread of the light flux of the laser light L0.

In the embodiment, the convergence α of the laser light L0 is modified along the vertical direction. In other words, the convergence α of the laser light L0 is modified in conjunction with the first rotation operation by the focus controller 20.

The description will first focus on the horizontal-direction center of the screen 61 (the line segment connecting a first position P1, a second position P2, and a third position P3 shown in FIG. 1A). For example, the laser light L0 converges at the horizontal-direction center of the screen 61. The convergence α of the laser light L0 is modified according to the change of the vertical-direction position (the change between the first position P1 and the second position P2) of the laser light L0. The laser light L0 converges even when the vertical-direction position of the laser light L0 is changed at the horizontal-direction center of the screen 61. Thereby, the state in which the size of the spot of the laser light L0 on the image surface 60 is small is maintained regardless of the vertical-direction position on the image surface 60.

For example, as shown in FIG. 1B, the distance from the reflective surface 31 changes according to the change of the position substantially along the vertical direction inside the image surface 60. For example, the distance between the reflective surface 31 and the first position P1 inside the image surface 60 is short. The distance between the reflective surface 31 and the second position P2 inside the image surface 60 is long. The distance between the reflective surface 31 and the third position P3 that is between the first position P1 and the second position P2 inside the image surface 60 is medium.

In the embodiment, the convergence α of the laser light L0 is changed in conjunction with the change of the distance from the reflective surface 31. For example, the convergence α of a first laser light L1 incident on the first position P1 close to the reflective surface 31 is a first convergence. The first convergence is a large angle. For example, the convergence α of a second laser light L2 incident on the second position P2 far from the reflective surface 31 is a second convergence having an angle that is smaller than that of the first convergence. The convergence α of a third laser light L3 incident on the third position P3 is a third convergence that is between the first convergence and the second convergence.

Thereby, the state in which the size of the spot of the laser light L0 on the image surface 60 is small can be maintained regardless of the vertical-direction position inside the image surface 60.

In the embodiment, the vertical-direction position of the laser light L0 on the image surface 60 is controlled by performing the first rotation operation around the first direction D1 of the reflective surface 31. Accordingly, in the embodiment, the focus controller 20 modifies the convergence α of the laser light L0 in conjunction with the first rotation operation. Thereby, the state in which the size of the spot of the laser light L0 on the image surface 60 is small can be maintained regardless of the vertical-direction position inside the image surface 60.

The size of the spot of the laser light L0 when the horizontal-direction position inside the image surface 60 changed will now be described.

Here, the angle between the image surface 60 and the plane including the first direction D1 and the second direction D2 is taken as an angle θ (referring to FIG. 1B). As in the embodiment, in the case where the size of the spot Ls of the laser light L0 on the image surface 60 is changed by modifying the convergence α of the laser light L0 in conjunction with the first rotation operation, it was found that the change of the size of a spot Ls when the horizontal-direction position inside the image surface 60 changes depends on the angle θ. For example, the image is displayed by rotating the reflective surface 31 around the first direction D1 and by rotating the reflective surface 31 around the second direction D2. At this time, there are cases where the change of the size of the spot Ls inside the screen 61 is large and cases where the change of the size of the spot Ls inside the screen 61 is small according to the settings of the first direction D1 and the second direction D2. This is because the second rotation operation around the second direction D2 is performed in conjunction with the first rotation operation around the first direction D1 in the scanning of the laser light L0.

The change of the size of the spot Ls of the laser light L0 that corresponds to the change of the horizontal-direction position of the laser light L0 inside the screen 61 (inside the image surface 60) will now be described.

FIG. 3A to FIG. 3G are schematic views showing characteristics of the projector and portable terminal according to the first embodiment.

These drawings show simulation results of the spot Ls of the laser light L0 on the image surface 60. In the simulation, the convergence α of the laser light L0 is not modified when scanning in the second rotation operation (e.g., the horizontal direction). In other words, the convergence α of the laser light L0 is modified in conjunction with the first rotation operation; and the convergence α is constant for the second rotation operation.

Figures 3A, 3B, 3C, 3D, 3E, 3F, 3G:
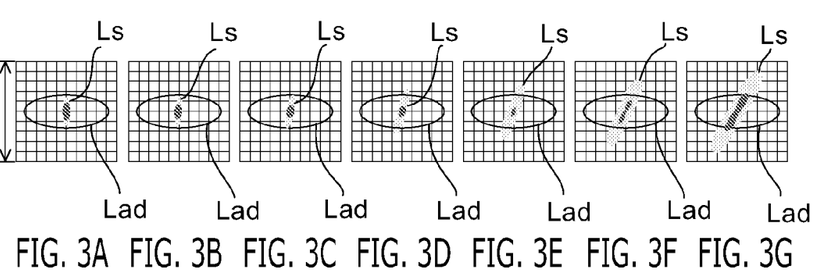
FIG. 3A to FIG. 3G are schematic views showing characteristics of the projector and portable terminal according to the first embodiment.
Figures 4A, 4B, 4C, 4D:
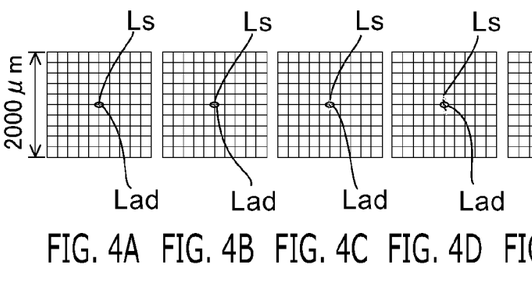
FIG. 4A to FIG. 4G are schematic views showing characteristics of a projector of a reference example.
Figures 4E, 4F, 4G:
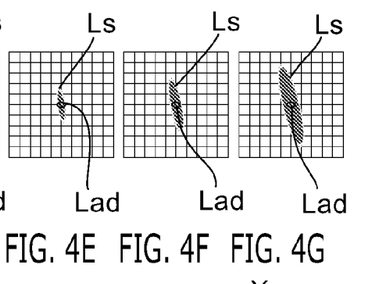

FIG. 3A to FIG. 3G respectively correspond to characteristics at different positions in the horizontal direction. FIG. 3A corresponds to the first position P1 shown in FIG. 1A. FIG. 3G corresponds to a fourth position P4 shown in FIG. 1A. The first position P1 corresponds to the horizontal-direction center of the screen 61. The fourth position P4 corresponds to the horizontal-direction end of the screen 61. FIG. 3B to FIG. 3F respectively correspond to positions arranged from the first position P1 toward the fourth position P4 in this order. An Airy disc Lad is shown in these drawings to indicate the diffraction limit. In the example, the angle θ recited above is 87 degrees.

As shown in FIG. 3A to FIG. 3G, the size of the spot Ls of the laser light L0 is small and is equivalent to or smaller than the size of the Airy disc Lad even for different positions in the horizontal direction. By setting the angle θ to be 87 degrees (about 90 degrees), the size of the spot Ls can be maintained to be small even when the horizontal-direction position inside the image surface 60 changes.

A small defocus occurs when scanning the laser light L0 along the horizontal direction. Therefore, for example, the size of the spot Ls in FIG. 3G is larger than the size of the spot Ls in FIG. 3A. However, the increase in size is small; and the size of the spot Ls is maintained to be substantially equivalent to the size of the Airy disc Lad.

FIG. 4A to FIG. 4G are schematic views showing characteristics of a projector of a reference example.

In the reference example, the angle θ recited above is 33 degrees. As shown in FIG. 1B, the laser light L0 is irradiated onto the reflective surface 31 from obliquely upward in the projector 110 recited above in which the angle θ is 87 degrees. On the other hand, the laser light L0 is irradiated onto the reflective surface 31 from below in the reference example in which the angle θ is 33 degrees. The position of the reflective surface 31 with respect to the surface 65 in the reference example is the same as the position of the reflective surface 31 with respect to the surface 65 in the projector 110.

FIG. 4A to FIG. 4G respectively correspond to the positions inside the image surface 60 shown in FIG. 3A to FIG. 3G. The scale of FIG. 4A to FIG. 4G is different from the scale of FIG. 3A to FIG. 3G. In FIG. 4A to FIG. 4G as well, the Airy disc Lad that indicates the diffraction limit is shown as a reference size.

In the reference example as shown in FIG. 4A to FIG. 4G, the size of the spot Ls of the laser light L0 changes greatly for the different positions in the horizontal direction. For example, in FIG. 4A, the size of the spot Ls is substantially equivalent to the size of the Airy disc Lad. However, in FIG. 4G, the size of the spot Ls is extremely large compared to the size of the Airy disc Lad. Thus, in the reference example in which the angle is 33 degrees, the size of the spot Ls changes greatly according to the position in the horizontal direction; and a high-resolution display is difficult.

Conversely, by setting the angle θ to be, for example, about 90 degrees (in the example, 87 degrees), the state in which the size of the spot Ls of the laser light L0 is small can be maintained not only for the change of the vertical-direction position but also for the change of the horizontal-direction position. By setting the angle θ to be about 90 degrees, the state in which the size of the spot Ls is small can be maintained in both the vertical direction and the horizontal direction by modifying the convergence α in conjunction with the scanning in the vertical direction but without modifying the convergence in the scanning in the horizontal direction; and a high-resolution display is possible.

In the embodiment, the angle between the reflective surface 31 and the image surface 60 formed by the laser light L0 emitted from the light scanning unit 30 is set to be substantially 90 degrees. For example, the angle θ (referring to FIG. 1B) between the image surface 60 and the plane including the first direction D1 and the second direction D2 is not less than 80 degrees and not more than 100 degrees. Thereby, the size of the spot of the laser light L0 can be uniformly small inside the image surface 60 for not only the vertical direction but also for the horizontal direction.

Figure 5:
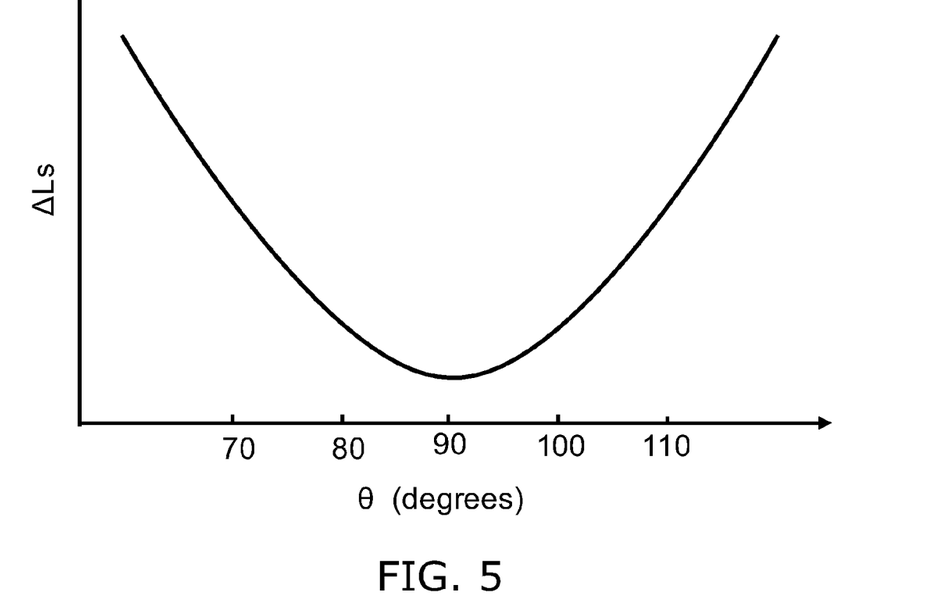
FIG. 5 is a graph showing a characteristic of the projector and portable terminal according to the first embodiment.

FIG. 5 is a graph showing a characteristic of the projector and portable terminal according to the first embodiment.

FIG. 5 shows the change of the size of the spot Ls of the laser light L0 on the image surface 60 when the angle θ is changed. The horizontal axis is the angle θ. The vertical axis is a normalized difference (a change ΔLs) between the maximum value and the minimum value of the spot Ls of the laser light L0 inside the screen 61 having a prescribed size. The change ΔLs of the spot Ls being small corresponds to the spot Ls being uniformly small inside the screen 61.

As shown in FIG. 5, the change ΔLs of the spot Ls becomes small when the angle θ is about 90 degrees. A sufficiently small change ΔLs is obtained when the angle θ is not less than 80 degrees and not more than 100 degrees. Thereby, a small spot Ls corresponding to a high resolution is obtained for the entire interior (both the vertical direction and the horizontal direction) of the screen 61.

Thus, the size of the spot Ls of the laser light L0 can be uniformly small by the angle θ between the image surface 60 and the plane including the first direction D1 and the second direction D2 being set to be not less than 80 degrees and not more than 100 degrees; and a high-resolution display is obtained.

In other words, in the embodiment, the change of the distance from the reflective surface 31 to the focal point can be small by setting the angle θ to be about 90 degrees (not less than 80 degrees and not more than 100 degrees). Thereby, the defocus when scanning the laser light L0 in the horizontal direction is suppressed. Then, an image that is in focus for the entire screen 61 is obtained by the focus control when scanning the laser light L0 in the vertical direction. Thereby, a high-resolution display is obtained.

According to the embodiment, a compact high-resolution projector and portable terminal can be provided.

The image surface 60 is formed by the laser light L0 being reflected at the reflective surface 31 and irradiated onto the surface 65 (e.g., the upper surface of the desk, etc.) from an oblique direction. Therefore, it may be considered that tilting the reflective surface 31 toward the surface 65 may reduce the distortion of the path of the laser light L0 on the surface 65 and easily form a natural image. However, from the results of the investigations performed by the inventor of the application (e.g., referring to FIG. 4A to FIG. 4G), it was found that compared to the case where the reflective surface 31 is perpendicular (the angle θ being not less than 80 degrees and not more than 100 degrees) to the surface 65 (i.e., the image surface 60), the size of the spot Ls of the laser light L0 changes greatly in the case where the reflective surface 31 is tilted (the angle θ being less than 80 degrees). For example, in the case where the convergence α is modified in conjunction with the scanning in the vertical direction but the convergence α is not modified in the scanning in the horizontal direction, the change of the size of the spot Ls of the laser light L0 is larger for the case where the reflective surface 31 is tilted with respect to the surface 65 than for the case where the reflective surface 31 is perpendicular to the surface 65. Therefore, the case where the reflective surface 31 is tilted with respect to the surface 65 is disadvantageous for the resolution.

In the embodiment, the first direction D1 that corresponds to the scanning in the vertical direction is set to be substantially parallel to the image surface 60. For example, the absolute value of the angle between the first direction D1 and the image surface 60 is not more than 5 degrees. Thereby, the fluctuation of the size of the spot Ls of the laser light L0 can be reduced easily.

In the embodiment, the incident angle of the laser light L0 incident on the reflective surface 31 may be set to be any angle that is not less than 10 degrees and not more than 80 degrees. For example, the angle between the laser light L0 incident on the reflective surface 31 and the direction perpendicular to the reflective surface 31 is not less than 10 degrees and not more than 80 degrees. By this angle, the light can be guided frontward and obliquely downward.

For example, the multifunctionality of portable terminals is progressing due to the popularity of portable terminals such as smartphones, etc. To maintain the convenience of the portable terminal, there is a limit to how much the size of the portable terminal can be increased. Therefore, the screen of the display unit provided in the portable terminal cannot be large. To enlarge and display the screen of the portable terminal, it may be considered to use a mini projector.

For example, in the case where a projector is provided in the portable terminal, there is a configuration in which, for example, the portable terminal is placed on the upper surface of the desk onto which the image is projected. By such a configuration, the display by the projector is simple; and the convenience of the portable terminal can be maintained.

The mini projector cannot be realized when a complex projection optical system is used. For example, the mini projector may be obtained by using a scanning optical system that uses a dual-axis MEMS mirror.

For example, when using a dual-axis MEMS mirror for low resolutions (a pixel size of, for example, not less than 500 μm, etc.), the mini projector can be realized using an optical system that scans collimated parallel laser light. However, in the case where the parallel laser light is used, the size of the spot Ls becomes undesirably large; and a high-resolution display is not obtained.

Therefore, for such a projector, it may be considered to use converging light having a controlled focus. By performing focus control, the size of the spot Ls can be maintained to be small as the vertical-direction position inside the screen 61 changes. However, if the angle θ recited above is inappropriate, there are cases where the size of the spot Ls becomes large as the horizontal-direction position changes.

In the embodiment, as described in regard to FIG. 3A to FIG. 3G, the size of the spot Ls can be maintained to be small even as the horizontal-direction position inside the screen 61 changes by appropriately setting the angle of the reflective surface 31 (the angle θ recited above). In other words, the size of the spot Ls for the entire screen 61 can be maintained to be small; and a high-resolution display can be realized.

Figure 6:
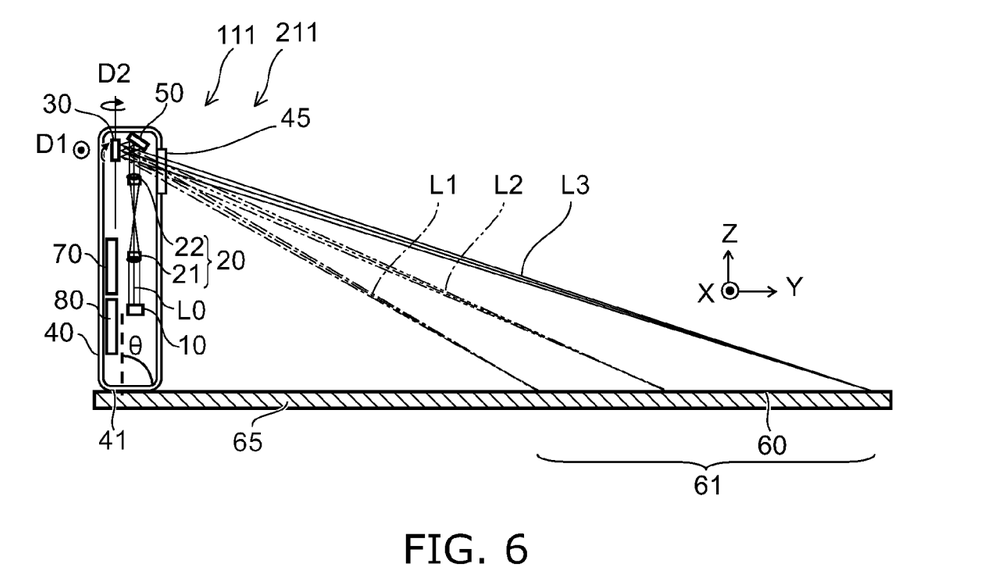
FIG. 6 is a schematic cross-sectional view showing another projector and portable terminal according to the first embodiment.

FIG. 6 is a schematic cross-sectional view showing another projector and portable terminal according to the first embodiment.

FIG. 6 shows the projector, the portable terminal, and the state of use of the projector and the portable terminal. FIG. 6 is a cross-sectional view corresponding to line A1-A2 of FIG. 1A.

As shown in FIG. 6, the portable terminal 211 according to the embodiment includes the projector 111 and the communicator 80. The projector 111 further includes a reflective optical element 50 in addition to the light source unit 10, the light scanning unit 30, and the focus controller 20. The configuration described in regard to the portable terminal 210 and the projector 110 can be employed for the communicator 80, the light source unit 10, the light scanning unit 30, and the focus controller 20; and a description is therefore omitted.

The reflective optical element 50 is provided between the focus controller 20 and the light scanning unit 30 in the optical path Lp of the laser light L0. The reflective optical element 50 causes the laser light L0 emitted from the focus controller 20 to be incident on the light scanning unit 30 by reflecting the laser light L0. In other words, in the example, the laser light L0 emitted from the light source unit 10 is incident on the light scanning unit 30 by being folded by the reflective optical element 50.

In the example, the direction from the light source unit 10 toward the focus controller 20 is set to be substantially perpendicular to the image surface 60. For example, the angle between the image surface 60 and the direction from the light source unit 10 toward the focus controller 20 is not less than 80 degrees and not more than 100 degrees. Then, the direction from the focus controller 20 toward the reflective optical element 50 also is set to be substantially perpendicular to the image surface 60. For example, the angle between the image surface 60 and the direction from the focus controller 20 toward the reflective optical element 50 is not less than 80 degrees and not more than 100 degrees. Thereby, the width of the space where the light source unit 10, the focus controller 20, and the reflective optical element 50 are provided can be narrow; and the device can be more compact.

According to the projector 111 and the portable terminal 211, a high-resolution projector and portable terminal that are more compact can be provided.

In the embodiment, for example, the vertical direction of the screen 61 is set to be the direction (e.g., the Y-axis direction) that is away from or toward the projector. The horizontal direction of the screen 61 is set to be the direction perpendicular to the vertical direction. In the beam scanning by the MEMS mirror, for example, the scanning in the vertical direction is performed at a frequency that is half of the refresh rate of the screen 61. On the other hand, in the horizontal direction, the scanning is performed at a high frequency that is ½ of the refresh rate multiplied by ½ of the number of scanning lines, i.e., the value of ¼ of the refresh rate multiplied by the number of scanning lines. Further, according to the scanning method, there are cases where operations at higher frequencies are used.

There are cases where it is difficult for the physical focus operation of the converging optical elements to keep up with the operation frequency in the horizontal direction. Therefore, in the embodiment, the focus control is performed at least in the beam scanning of the vertical direction. In other words, the focus controller 20 modifies the convergence α of the laser light L0 in conjunction with at least the first rotation operation.

For example, the focus controller 20 does not change the convergence α of the laser light L0 in conjunction with the second rotation operation. Or, the magnitude of the change by the focus controller 20 of the convergence α of the laser light L0 in conjunction with the first rotation operation is greater than the magnitude of the change by the focus controller 20 of the convergence α of the laser light L0 in conjunction with the second rotation operation. The device can be made more compact by not performing the change of the convergence α of the laser light L0 in conjunction with the second rotation operation.

In the embodiment, the focus control is performed by the focus controller 20. For example, the position of the first converging optical element 21 provided in the focus controller 20 is moved along the optical path Lp of the laser light L0. Thereby, the focus control is performed. For example, the movement of the position is possible by a moving magnet, a moving coil, etc.

For example, a movement distance d1 of the first converging optical element 21 along the optical path Lp of the laser light L0 passing through the first converging optical element 21 is not more than 2.0 mm. By setting the movement distance d1 to not more than 2.0 mm, the operation speed of the first converging optical element 21 can be increased. For example, the operation frequency of the movement of the first converging optical element 21 can be increased. By setting the movement distance d1 to be, for example, not more than 0.8 mm, the operation speed of the first converging optical element 21 can be increased further.

The case where the first converging optical element 21 is movable is described above. In the embodiment, for example, the second converging optical element 22 may be movable; and the first converging optical element 21 may be fixed. In such a case as well, similarly to the description recited above, the convergence α can be controlled; and a compact high-resolution projector and portable terminal are obtained.

Another example of the focus controller 20 according to the embodiment will now be described.

Figure 7:
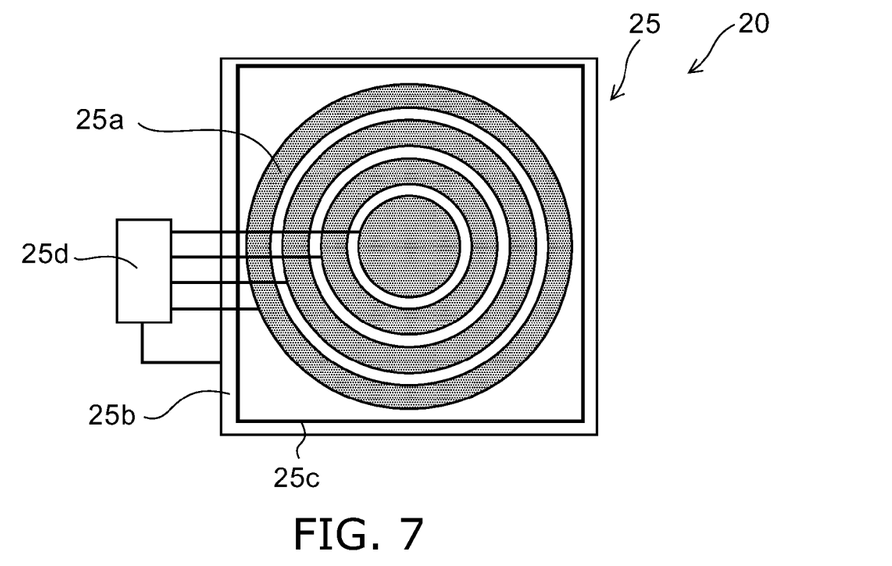
FIG. 7 is a schematic plan view showing a portion of the projector according to the first embodiment.

FIG. 7 is a schematic plan view showing a portion of the projector according to the first embodiment.

In the example, a liquid crystal lens 25 is used as the focus controller 20. The focal distance of the liquid crystal lens 25 is controlled by a voltage applied to the liquid crystal. A second light-transmissive electrode 25b and multiple first light-transmissive electrodes 25a having concentric circular configurations are provided in the liquid crystal lens 25. A liquid crystal layer 25c is provided between these electrodes. A driver 25d is connected to the multiple first light-transmissive electrodes 25a and the second light-transmissive electrode 25b. The driver 25d changes the refractive index distribution of the liquid crystal layer 25c by changing the liquid crystal alignment of the liquid crystal layer 25c by applying the voltage to the first light-transmissive electrode 25a and the second light-transmissive electrode 25b. A lens effect is obtained by the change of the refractive index distribution. The focal distance of the lens can be modified by modifying the value of the voltage.

Figure 8:
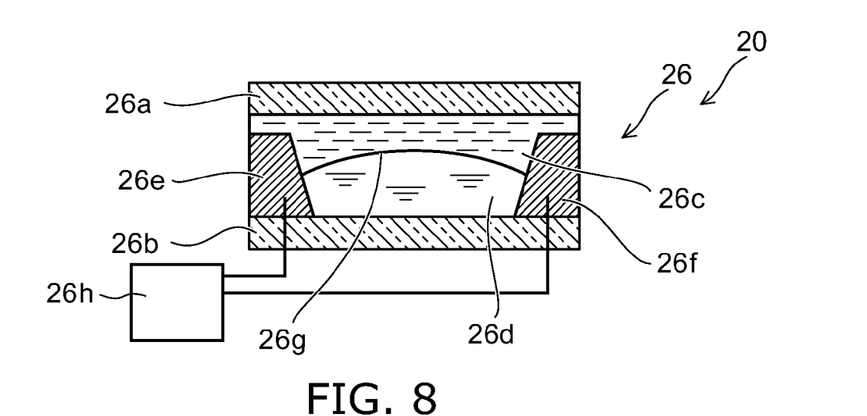
FIG. 8 is a schematic cross-sectional view showing a portion of the projector according to the first embodiment.

FIG. 8 is a schematic cross-sectional view showing a portion of the projector according to the first embodiment.

In the example, a liquid lens 26 is used as the focus controller 20. A first electrode 26e and a second electrode 26f are provided between a first light-transmissive substrate 26a and a second light-transmissive substrate 26b in the liquid lens 26. A first liquid 26c and a second liquid 26d are provided in the region that is between the first light-transmissive substrate 26a and the second light-transmissive substrate 26b and between the first electrode 26e and the second electrode 26f. The refractive index of the second liquid 26d is different from the refractive index of the first liquid 26c. The solubility between the first liquid 26c and the second liquid 26d is low. These liquids substantially do not mix with each other. In other words, an interface 26g is formed between the first liquid 26c and the second liquid 26d. For example, an aqueous solution is used as the first liquid 26c. For example, an oil is used as the second liquid 26d. A driver 26h applies a voltage to the first electrode 26e and the second electrode 26f. The configuration of the interface 26g changes due to the voltage. The driver 26h changes the configuration of the interface 26g. The liquid lens 26 functions as a lens having a focal point that is variable by the change of the configuration of the interface 26g.

Figure 9:
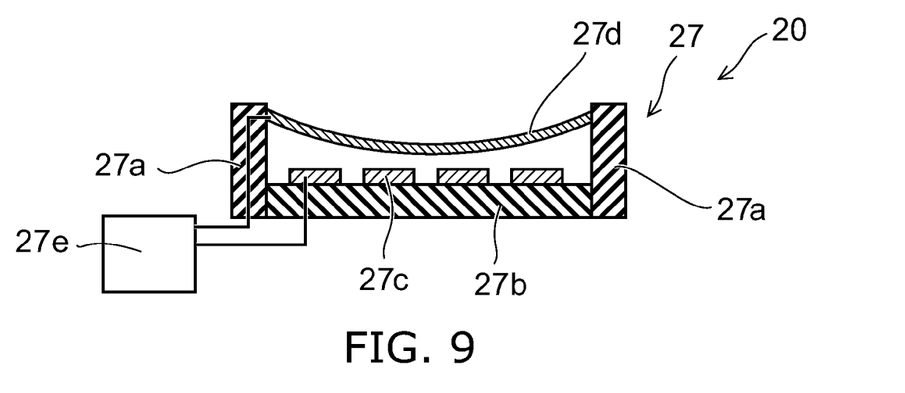
FIG. 9 is a schematic cross-sectional view showing a portion of the projector according to the first embodiment.

FIG. 9 is a schematic cross-sectional view showing a portion of the projector according to the first embodiment.

In the example, an electrostatic mirror 27 is used as the focus controller 20. In the electrostatic mirror 27, a thin film mirror 27d is held by a holding body 27a connected to a substrate 27b. An electrode 27c is provided on the substrate 27b; and the electrode 27c and the thin film mirror 27d are separated from each other. A driver 27e generates an electrostatic force between the electrode 27c and the thin film mirror 27d by applying a voltage to the electrode 27c. Thereby, the driver 27e causes the thin film mirror 27d to deform. The curvature of the thin film mirror 27d is changed by the electrostatic force. Thereby, the focal distance of the electrostatic mirror 27 can be controlled. Thus, the focus controller 20 may include a reflection-type optical element.

Other than the configurations described above, any configuration for which downsizing is possible is applicable to the focus controller 20.

An example of the light source unit 10 used in the embodiment will now be described.

Figure 10:
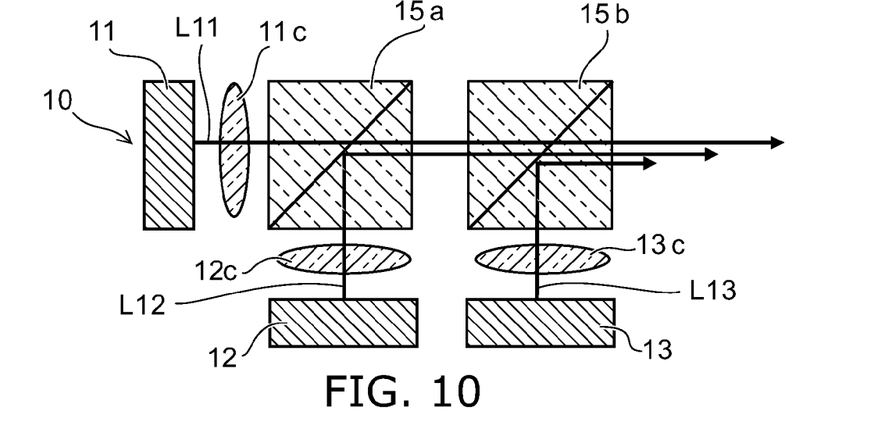
FIG. 10 is a schematic cross-sectional view showing a portion of the projector according to the first embodiment.

FIG. 10 is a schematic cross-sectional view showing a portion of the projector according to the first embodiment.

FIG. 10 shows an example of the light source unit 10. In the example, the light source unit 10 includes a first light source element 11, a second light source element 12, and a third light source element 13.

The first light source element 11 emits a first component laser light L11 having a first peak wavelength. The second light source element 12 emits a second component laser light L12. The second component laser light L12 has a second peak wavelength that is different from the first peak wavelength. The third light source element 13 emits a third component laser light L13. The third component laser light L13 has a third peak wavelength that is different from the first peak wavelength and different from the second peak wavelength.

For example, the first component laser light L11 is red. The second component laser light L12 is green. The third component laser light L13 is blue. A color display is possible by using such a configuration.

In the example, the light source unit 10 further includes a first dichroic mirror 15a. The first dichroic mirror 15a transmits at least a portion of the first component laser light L11 and reflects at least a portion of the second component laser light L12.

The light source unit 10 further includes a second dichroic mirror 15b. The second dichroic mirror 15b transmits at least a portion of the second component laser light L12 and reflects at least a portion of the third component laser light L13. In the example, the second dichroic mirror 15b also transmits at least a portion of the first component laser light L11.

By using such dichroic mirrors, laser light having components of different colors can be mixed.

In the example, the light source unit 10 further includes a first light source-side collimating optical element 11c. The first light source-side collimating optical element 11c is provided between the first light source element 11 and the first dichroic mirror 15a. The first light source-side collimating optical element 11c collimates the first component laser light L11. The light source unit 10 further includes a second light source-side collimating optical element 12c. The second light source-side collimating optical element 12c is provided between the second light source element 12 and the first dichroic mirror 15a. The second light source-side collimating optical element 12c collimates the second component laser light L12. The light source unit 10 further includes a third light source-side collimating optical element 13c. The third light source-side collimating optical element 13c is provided between the third light source element 13 and the second dichroic mirror 15b. The third light source-side collimating optical element 13c collimates the third component laser light L13.

By such a configuration, highly-parallel laser light is obtained; and the resolution can be increased further.

Figure 11:
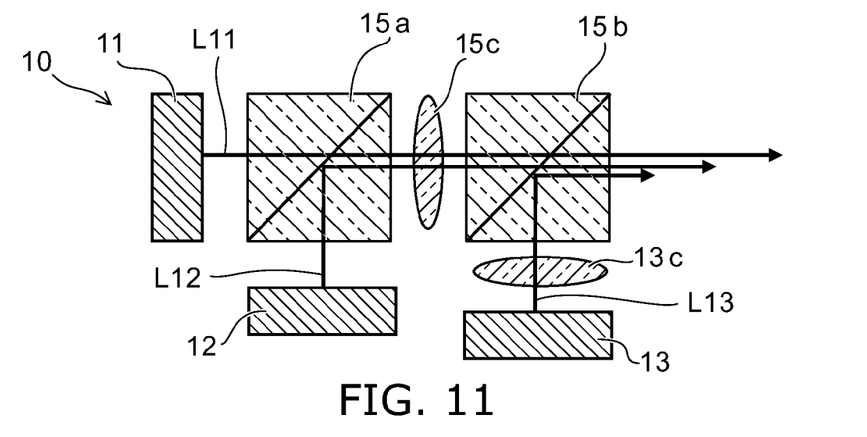
FIG. 11 is a schematic cross-sectional view showing a portion of the projector according to the first embodiment.

FIG. 11 is a schematic cross-sectional view showing a portion of the projector according to the first embodiment. FIG. 11 shows another example of the light source unit 10. In the example, the first light source-side collimating optical element 11c and the second light source-side collimating optical element 12c are not provided in the light source unit 10. In the light source unit 10, a collimating optical element 15c is provided between the dichroic mirrors. Otherwise, the configuration of the light source unit 10 described in regard to FIG. 10 may be used.

The collimating optical element 15c that is between the dichroic mirrors is provided between, for example, the first dichroic mirror 15a and the second dichroic mirror 15b. The collimating optical element 15c that is between the dichroic mirrors collimates the first component laser light L11 and the second component laser light L12.

In the example, the number of parts included in the light source unit 10 can be reduced.

Figure 12:
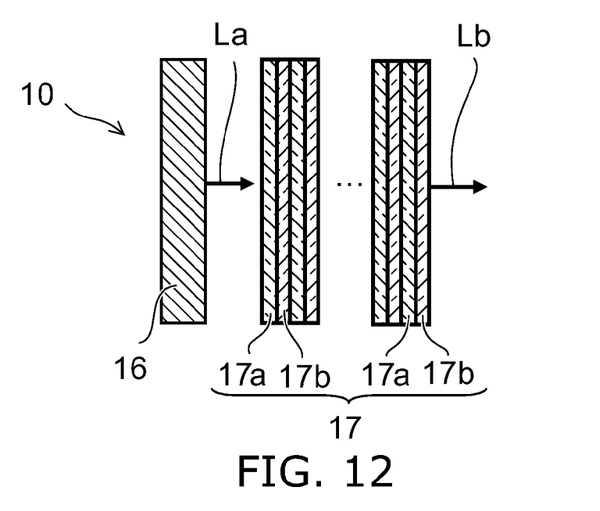
FIG. 12 is a schematic cross-sectional view showing a portion of the projector according to the first embodiment.

FIG. 12 is a schematic cross-sectional view showing a portion of the projector according to the first embodiment. FIG. 12 shows an example of the light source unit 10. In the example, the light source unit 10 includes a second harmonic generation element (SHG element) as the light source element. In other words, the light source unit 10 includes an infrared laser element 16 and a second harmonic generation element (a SHG element 17). The infrared laser element 16 emits infrared laser light La. The infrared laser light La that is emitted from the infrared laser element 16 is incident on the SHG element 17. The SHG element 17 emits light Lb of a wavelength that is ½ of the wavelength of the infrared laser light La.

For example, the SHG element 17 includes multiple first layers 17a stacked alternately with multiple second layers 17b. These layers may include, for example, a ferroelectric material. For example, the direction of the spontaneous polarization of the first layer 17a is a direction reverse to the direction of the spontaneous polarization of the second layer 17b. By such a SHG element 17, the wavelength of the infrared laser light La can be halved. For example, the light Lb is green light. For example, a highly-efficiency light emission is obtained by such a configuration in the case where the luminous efficiency of a green laser-light emitting element is low and the luminous efficiency of the infrared laser element 16 is high.

Such a configuration is applicable to one selected from the first light source element 11, the second light source element 12, and the third light source element 13. For example, the configuration is applicable to the second light source element 12 in the case where the second light source element 12 emits green laser light.

Second Embodiment

In the embodiment, the portion inside the image surface 60 where the image is displayed is controlled. The embodiment uses either the projector or the portable terminal described in regard to the first embodiment, or its modifications.

Figure 13A:
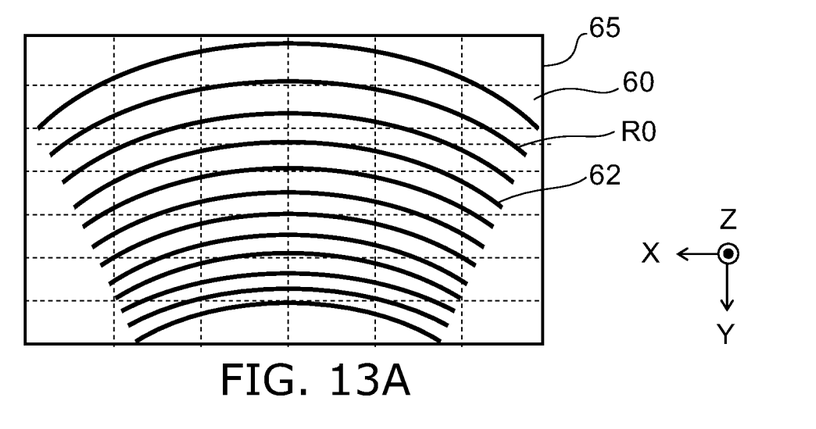
FIG. 13A to FIG. 13C are schematic plan views showing an operation of the projector and portable terminal according to the second embodiment.
Figure 13B:
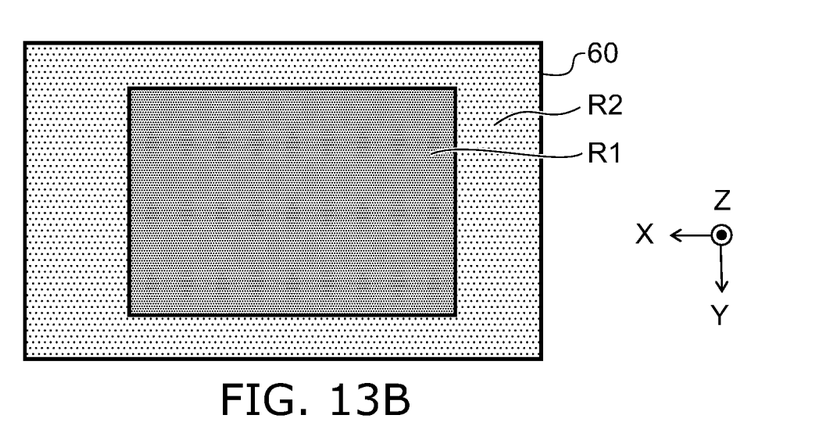
Figure 13C:
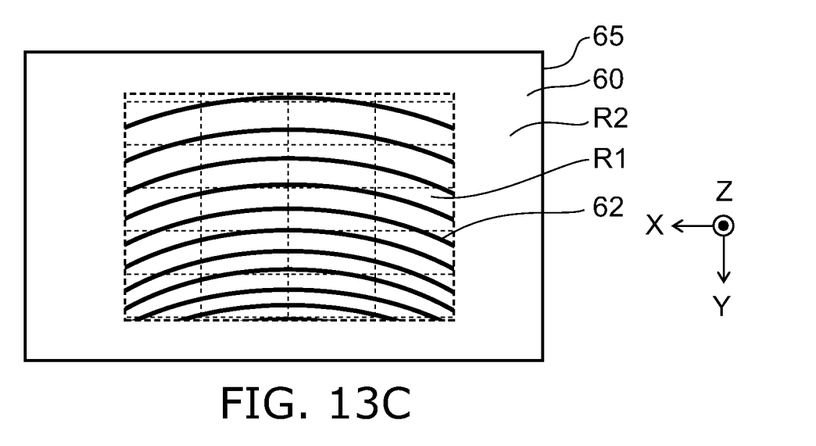

FIG. 13A to FIG. 13C are schematic plan views showing an operation of the projector and portable terminal according to the second embodiment.

FIG. 13A shows the irradiation region of the laser light L0 in the image surface 60. FIG. 13B shows the display region that is set in the image surface 60. FIG. 13C shows the irradiation state of the modulated laser light L0.

As shown in FIG. 13A, the configuration of the irradiation region R0 of the laser light L0 is a portion of a fan-like configuration. This is because the laser light L0 is scanned by the rotation operations of the reflective surface 31. A path 62 of the laser light L0 scanned on the image surface 60 has an arc-like configuration.

In such a case, in the embodiment as shown in FIG. 13B, a display region R1 and an outer region R2 are set in the image surface 60. The display region R1 is a predetermined region where the display is performed. The outer region R2 is a region outside the display region R1.

In the embodiment as shown in FIG. 13C, the display is performed inside the display region R1; and the display is substantially not performed in the outer region R2. For example, in the outer region R2, the intensity of the laser light L0 is lower and the brightness of the display is lower than in the display region R1. This operation is performed by changing the intensity of the laser light L0 emitted from the light source unit 10 between the display region R1 and the outer region R2.

For example, the light source unit 10 changes the intensity of the laser light L0 such that the intensity of the laser light L0 traveling toward the outer region R2 is lower than the intensity of the laser light L0 traveling toward the display region R1. This operation is performed by, for example, the controller 70. Thereby, the display is performed in the display region R1 of the predetermined configuration; and the display substantially is not performed in the outer region R2.

Thus, the path 62 that is traced on, for example, the desk by the beam scanned by the optical system is not rectangular and is distorted into a fan-like configuration. In such a case, the configuration of the desired path 62 can be obtained by modulating the laser light L0 between the desired display region R1 and the other regions (the outer region R2). Thereby, the desired display, e.g., a rectangular display, is obtained.

In the embodiment, the image data may be modulated according to the curve of the path 62 of the laser light L0. Thereby, the desired configuration can be formed in the image surface 60. The modulation may be performed by, for example, the controller 70.

Conventionally, there was only a desktop-projection-type projector that performs a low-resolution image projection using a laser or a desktop-projection-type projector that performs a high-resolution projection using a large and exceedingly complex optical system.

In the embodiments, for example, a scanning laser desktop-projection optical system that uses a dual-axis MEMS mirror (the reflective surface 31) is used. An operation at a low frequency is performed in the first rotation operation around the first direction D1. An operation at a high frequency is performed in the second rotation operation around the second direction D2. The optical path length from the MEMS mirror to the projection surface (the image surface 60) changes greatly according to the first rotation operation. Therefore, in the embodiment, a focus servo operation that is synchronous with the first rotation operation is performed for the light that is incident on the MEMS. On the other hand, for the second rotation operation which has the high-speed operation, the change of the optical path length from the MEMS mirror to the projection surface can be small by setting the MEMS mirror to be substantially perpendicular to the projection surface. Thereby, the size of the spot Ls can be stable and small in the second rotation operation even without using the focus servo operation.

By using the configurations according to the embodiments, a high-resolution display is obtained without providing a complex optical system between the MEMS mirror and the image surface 60. Thereby, high resolution is obtained using a compact and simple optical system.

According to the embodiments, a compact high-resolution projector and portable terminal can be provided.

In the specification of the application, "perpendicular" and "parallel" refer to not only strictly perpendicular and strictly parallel but also include, for example, the fluctuation due to manufacturing processes, etc. It is sufficient to be substantially perpendicular and substantially parallel.

Hereinabove, embodiments of the invention are described with reference to specific examples. However, the invention is not limited to these specific examples. For example, one skilled in the art may similarly practice the invention by appropriately selecting specific configurations of components included in the projector and the portable terminal such as the light source unit, the light scanning unit, the focus controller, the converging optical element, the laser element, the collimating optical element, the light source element, the light source-side collimating optical element, the dichroic mirror, the infrared laser element, the SHG element, the driver, the reflective surface, the housing, the reflective optical element, the communicator, etc., from known art; and such practice is within the scope of the invention to the extent that similar effects are obtained.

Further, any two or more components of the specific examples may be combined within the extent of technical feasibility and are included in the scope of the invention to the extent that the purport of the invention is included.

Moreover, all projectors and portable terminals practicable by an appropriate design modification by one skilled in the art based on the projectors and the portable terminals described above as embodiments of the invention also are within the scope of the invention to the extent that the spirit of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A projector, comprising:
a light source unit configured to emit laser light;
a light scanning unit including
a holder capable of a first rotation operation around a first direction, and
a reflective surface held by the holder and capable of a second rotation operation around a second direction intersecting the first direction, the laser light being configured to be incident on the reflective surface,
the light scanning unit being configured to scan the laser light by the first rotation operation and the second rotation operation; and
a focus controller provided between the light source unit and the light scanning unit in an optical path of the laser light to modify a convergence of the laser light in conjunction with the first rotation operation,
an angle between a plane and an image surface being not less than 80 degrees and not more than 100 degrees, the plane including the first direction and the second direction, the image surface being formed by the laser light emitted from the light scanning unit.

2. The projector according to claim 1, wherein an absolute value of an angle between the first direction and the image surface is not more than 5 degrees.

3. The projector according to claim 1, wherein the light source unit includes
a first light source element configured to emit a first component laser light having a first peak wavelength,
a second light source element configured to emit a second component laser light having a second peak wavelength different from the first peak wavelength, and
a third light source element configured to emit a third component laser light having a third peak wavelength different from the first peak wavelength and different from the second peak wavelength.

4. The projector according to claim 3, wherein the light source unit further includes a first dichroic mirror configured to transmit at least a portion of the first component laser light and reflect at least a portion of the second component laser light.

5. The projector according to claim 4, wherein the light source unit further includes a second dichroic mirror configured to transmit at least a portion of the second component laser light and reflect at least a portion of the third component laser light.

6. The projector according to claim 1, wherein the light source unit includes
a first light source element configured to emit a first component laser light having a first peak wavelength,
a second light source element configured to emit a second component laser light having a second peak wavelength different from the first peak wavelength,
a first dichroic mirror configured to transmit at least a portion of the first component laser light and reflect at least a portion of the second component laser light, and
a first light source-side collimating optical element provided between the first light source element and the first dichroic mirror to collimate the first component laser light.

7. The projector according to claim 1, wherein the light source unit includes
- a first light source element configured to emit a first component laser light having a first peak wavelength,
- a second light source element configured to emit a second component laser light having a second peak wavelength different from the first peak wavelength,
- a first dichroic mirror configured to transmit at least a portion of the first component laser light and reflect at least a portion of the second component laser light, and
- a collimating optical element configured to collimate the first component laser light, and
- the first dichroic mirror is disposed between the first light source element and the collimating optical element.

8. The projector according to claim 1, wherein the light source unit includes
- a laser element configured to emit the laser light, and
- a collimating optical element configured to collimate the laser light emitted from the laser element.

9. The projector according to claim 1, wherein the light source unit includes
- an infrared laser element configured to emit infrared laser light, and
- a second harmonic generation element, the infrared laser light being incident on the second harmonic generation element, the second harmonic generation element being configured to emit light of a wavelength that is ½ of a wavelength of the infrared laser light.

10. The projector according to claim 1, wherein
- the focus controller includes a converging optical element, the laser light emitted from the light source unit being incident on the converging optical element, and
- the converging optical element is movable and is configured to emit laser light configured to converge.

11. The projector according to claim 10, wherein a movement distance of the converging optical element along the optical path of the laser light passing through the converging optical element is not more than 2.0 mm.

12. The projector according to claim 1, wherein the focus controller includes
- a first light-transmissive electrode,
- a second light-transmissive electrode,
- a liquid crystal layer provided between the first light-transmissive electrode and the second light-transmissive electrode, and
- a driver configured to change a refractive index distribution of the liquid crystal layer by changing a liquid crystal alignment of the liquid crystal layer by applying a voltage to the first light-transmissive electrode and the second light-transmissive electrode.

13. The projector according to claim 1, wherein the focus controller includes
- a first liquid having a first refractive index,
- a second liquid capable of forming an interface with the first liquid, the second liquid having a second refractive index different from the first refractive index,
- an electrode opposing the first liquid and the second liquid, and
- a driver configured to change a configuration of the interface by applying a voltage to the electrode.

14. The projector according to claim 1, wherein the focus controller includes
- an electrode,
- a thin film mirror separated from the electrode,
- a holding body configured to hold the thin film mirror, and
- a driver configured to cause the thin film mirror to deform by generating an electrostatic force between the electrode and the thin film mirror by applying a voltage to the electrode.

15. The projector according to claim 1, further comprising a reflective optical element provided between the focus controller and the light scanning unit in the optical path of the laser light to cause the laser light emitted from the focus controller to be incident on the light scanning unit by reflecting the laser light emitted from the focus controller.

16. The projector according to claim 15, wherein the angle between the image surface and a direction from the focus controller toward the reflective optical element is not less than 80 degrees and not more than 100 degrees.

17. The projector according to claim 1, wherein
- a display region is predetermined and provided on the image surface, and an outer region is provided on the image surface outside the display region, and
- the light source unit is configured to change an intensity of the laser light to be lower for the laser light traveling toward the outer region than for the laser light traveling toward the display region.

18. The projector according to claim 1, wherein an angle between the laser light incident on the reflective surface and a direction perpendicular to the reflective surface is not less than 10 degrees and not more than 80 degrees.

19. A portable terminal, comprising:
- a projector including
  - a light source unit configured to emit laser light,
  - a light scanning unit including
    - a holder capable of a first rotation operation around a first direction, and
    - a reflective surface held by the holder and capable of a second rotation operation around a second direction intersecting the first direction, the laser light being configured to be incident on the reflective surface,
  - the light scanning unit being configured to scan the laser light by the first rotation operation and the second rotation operation, and
  - a focus controller provided between the light source unit and the light scanning unit in an optical path of the laser light to modify a convergence of the laser light in conjunction with the first rotation operation,
  - an angle between a plane and an image surface being not less than 80 degrees and not more than 100 degrees, the plane including the first direction and the second direction, the image surface being formed by the laser light emitted from the light scanning unit; and
- a communicator capable of acquiring data to be displayed by the projector.

* * * * *